United States Patent Office 3,544,211
Patented Dec. 1, 1970

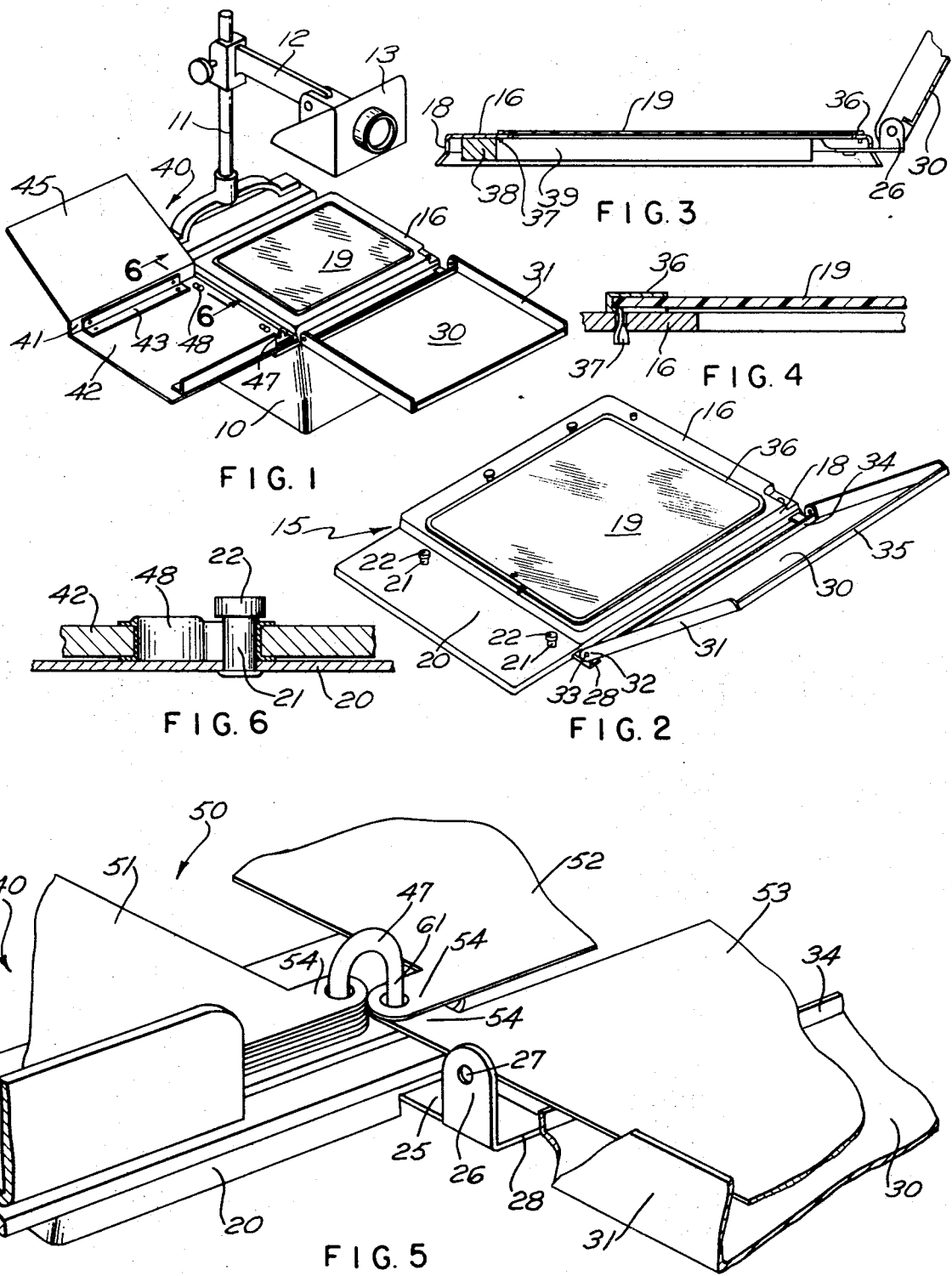

3,544,211
AUXILIARY STAGE FOR A VISUAL PROJECTOR
Percy Frederick Albee, Jr., Barrington, R.I., assignor to
Q-Panel Corporation, a corporation of Rhode Island
Filed Apr. 22, 1968, Ser. No. 723,158
Int. Cl. G03b 21/64
U.S. Cl. 353—120      5 Claims

ABSTRACT OF THE DISCLOSURE

A stage comprising a frame with a transparent window to be positioned over a visual projector with a plate to cover the transparent window and also provide a shelf for projectuals. Means are also provided to detachably connect a structure containing a plurality of visuals or projectuals which may be pivoted to the transparent portion of the stage and thereafter moved to a position on the shelf.

BACKGROUND OF THE INVENTION

An auxiliary stage device for a visual projector is, in effect, an adapter which in the past has been made to accommodate special types and shapes of transparencies to the many different makes of projectors which are on the market. In general, the auxiliary stages have a surface material which must be transparent through which light is projected to the lens system. This transparent surface material has usually been rigidly attached to the frame of the auxiliary stage or made an integral part thereof. In use, scratches will develop on the surface of the plastic material, and this will inhibit the proper use of the device and require the complete replacement of the stage. It is, therefore, desirable to provide some protective device so that the transparent surface on the auxiliary stage may be properly protected. Additionally, it has not been the practice to have receiving trays as an integral part of the auxiliary stage so that the transparencies which have been projected can be stored immediately after use. The instant invention obviates these difficulties by providing a transparent surface for the auxiliary stage which not only can be readily replaced but also the auxiliary stage is provided with a cover for the transparent surface which, when not in use as a cover, serves as a shelf to receive the previously projected transparencies.

SUMMARY OF THE INVENTION

A stage, which may be positioned over the light emitting opening of a projector has a transparent window for receiving the projectuals for passing light thereto and is equipped with a plate which is hinged thereto at one edge that serves as a cover for the window and also a shelf to receive used projectuals to support them. At another edge of the stage frame there is detachably secured a shelf-back or container which will protect the projectuals and when one portion thereof is attached to the frame serves as a support for the projectuals. The projectuals may be either flipped through 180° onto the transparent window for projection or may be moved from the window where they are projected onto the shelf for receiving them.

BRIEF DESCRIPTION OF THE DRAWINGS

FIG. 1 is a perspective view showing a portion of a projector with the stage mounted thereon having a cover plate swung into a shelf position, while a projectual container is attached to another edge of the stage with one of its covers opened and showing how the other cover supports projectuals which may be placed therein;

FIG. 2 is a perspective view of the stage detached from the projector;

FIG. 3 is a sectional view of the stage taken on lines 3—3 of FIG. 2;

FIG. 4 is a fragmental enlarged sectional view showing the replaceable window;

FIG. 5 is a fragmental view showing the projectuals part of which are located in the book, one projectual being in projecting position over the window and another projectual being swung from the window onto the supporting shelf;

FIG. 6 is an enlarged fragmental section of the attaching means of the book to the frame.

DESCRIPTION OF THE PREFERRED EMBODIMENT

Within reference to the drawings 10 designates the housing of a projector which has a standard 11 extending from the rear part thereof with an arm 12 to which a lens system 13 is attached.

A stage designated generally 15 and shown in perspective by itself in FIG. 2 comprises a frame 16 of generally rectangular construction with downwardly extending flanges such as 18 at the edges thereof and providing a window 19 in the upper surface of the frame. A lip 20 extends from one edge of this frame and is provided with attaching studs 21 comprising heads 22 and a narrow neck portion beneath.

The stage 15 is also provided at opposite ends of one edge with brackets 25 (see FIG. 5) with upturned ears 26 having an opening 27 therein and abutting edges 28. A plate 30 has an edge flange 31 with portions 32 extending beyond the edge of the plate with these extending portions 32 hinged to the brackets 26 by eyelet 33. A flange along the hinged edge of the plate 30 and designated 34 will abut the edge 28 of the bracket so that the plate cannot swing beyond a plane closely adjacent the plane of the frame as shown in the position of FIG. 5, thus positioning the plate to extend outwardly from the projector and act as a shelf. This plate may swing thru 180° to a position to cover the window. A flange 35 at the outer edge of this plate also serves to assist in retaining projectuals on the shelf thus formed when moved into the position as shown in FIG. 5.

The window 19 which is shown in enlarged fragmental section in FIG. 4 is provided with a peripheral frame 36, and at spaced locations about this frame there are a number of depending studs or tangs 37 which pass through apertures in the frame 16. If studs are used, a variety of fastening means may be provided in the apertures in the frame 16, and if tangs are used as illustrated, they may be slightly twisted to secure the window and its frame to the stage frame 16.

The stage 15 is also provided with suitable means so that the same will remain on the upper surface of the projector housing. To this end block weights 38 and 39 are suitably affixed to the underside of the stage frame 16 on the edges of the frame that is directly opposite the hinged plate 30 and the lip 21, both of which support projectuals and/or the containers therefor, thus serving as a counterbalance means.

A projectual container generally designated 40 is shown in the drawings as a shelf-back and has a spine 41 with a supporting wall 42 and a cover wall 45, both hingedly related thereto. Projectuals generally designated 50 may be located in this container by having a number of grommet tabs as at 54 (see FIG. 5) which embrace a U-shaped anchor 47 so that when it is desired to move a projectual such as the projectual 51 into projecting position, it may be swung through 180° about the inverted anchor 47 to a position such as shown at 52 where it will be superimposed over the window 19, and after use it may be moved to a position such as shown at 53.

The projectual container 40 may be affixed to the stage by providing keyhole openings 48 in the wall 42, which openings may be engaged with the pins 21, the smaller portion of the keyhole opening sliding beneath the heads 22 locking the container in position on the supporting lip 20 of the stage.

I claim:

1. A stage for use with an overhead projector comprising a frame with a transparent window therein of a size to receive and transmit light through an overlay projectual, a plate hinged along one edge of the frame of a size to cover said transparent window and swingable from said covering position, means to limit the swinging movement of said plate to a swing of substantially 180° to provide a shelf for projectuals or the like, a lip extending from the frame along one of the edges adjacent to the edge to which the plate is hinged, means mounted on said lip to detachably secure a projectual container thereto, counterbalancing weights are attached along the edge of the base opposite the edge to which said plate is hinged and along the edge of the base opposite the edge having a lip extending therefrom to prevent the stage from tipping over when a pile of projectuals is stacked on either the lip or on the plate when it is in an open position and acting as a shelf.

2. A stage as in claim 1 wherein said plate has flanges along its edges.

3. A stage as in claim 1 wherein the stage has means for removably securing said window to the frame.

4. A stage as recited in claim 1 wherein said means to limit the swinging movement of said plate comprises an abutment on said frame to engage a portion of said plate to limit its movement to a plane substantially an extension of the general plane of said frame.

5. A stage as in claim 1 wherein a projectual container is detachably secured to said lip, said projectual container having means removably anchoring projectuals whereby projectuals may be flipped onto said window or onto said shelf while remaining anchored to said projectual container.

References Cited

UNITED STATES PATENTS

| | | | |
|---|---|---|---|
| 341,960 | 5/1886 | Stull | 402—76 |
| 947,620 | 1/1910 | Payne | 402—74 |
| 1,371,102 | 3/1921 | Lewis | 40—102 |
| 1,463,950 | 8/1923 | Goldberger | 40—104.18 X |
| 2,247,397 | 7/1941 | Oman | 402—76 X |
| 3,253,358 | 5/1966 | Wright | 40—106.1 |
| 3,264,936 | 8/1966 | Schultz et al. | 353—35 |
| 3,438,702 | 4/1969 | Milhaupt et al. | 353—35 |
| 3,438,703 | 4/1969 | Winnemann | 353—120 |

HARRY N. HAROIAN, Primary Examiner